United States Patent [19]
Sandoz et al.

[11] 4,371,957
[45] Feb. 1, 1983

[54] ANTISUBMARINE WARFARE SYSTEM

[75] Inventors: Oscar A. Sandoz; John Mar, both of Ottawa, Canada

[73] Assignee: Her Majesty the Queen in right of Canada, as represented by the Minister of National Defence, Canada

[21] Appl. No.: 889,852

[22] Filed: Dec. 12, 1969

[51] Int. Cl.$^3$ .............................................. G01S 3/82
[52] U.S. Cl. ...................... 367/3; 367/123; 367/173
[58] Field of Search ............... 340/2, 3 T, 6, 8 S, 340/9, 7 PCR; 367/3, 4, 5, 123, 165, 173

[56] References Cited
U.S. PATENT DOCUMENTS

| | | | |
|---|---|---|---|
| 3,019,412 | 1/1962 | Crawford | 340/7 |
| 3,116,471 | 12/1963 | Coop | 340/2 |
| 3,385,391 | 5/1968 | McLoad | 181/0.5 |
| 3,398,394 | 8/1968 | Luehrmann et al. | 340/7 |
| 3,444,508 | 5/1969 | Granfors et al. | 340/2 |
| 3,444,511 | 5/1969 | Morrow | 340/9 |
| 3,449,711 | 6/1969 | Ricketts, Jr. et al. | 340/6 |
| 3,461,421 | 8/1969 | Stover | 340/2 |

*Primary Examiner*—Richard A. Farley
*Attorney, Agent, or Firm*—Larson and Taylor

[57] ABSTRACT

A system for determining the direction of an underwater discrete source of acoustic vibrations by sensing acoustic wavefronts produced thereby, which system comprises a neutrally buoyant semirigid underwater platform which may be made of a water inflated soft walled material and having mounted thereon an array of omnidirectional hydrophones arranged in a predetermined geometric pattern. Circuit means are connected to the hydrophones and an array steering means is associated with the circuit means to allow determination of the time relationship of the signals obtained from the hydrophones.

15 Claims, 7 Drawing Figures

U.S. Patent   Feb. 1, 1983   Sheet 1 of 2   4,371,957
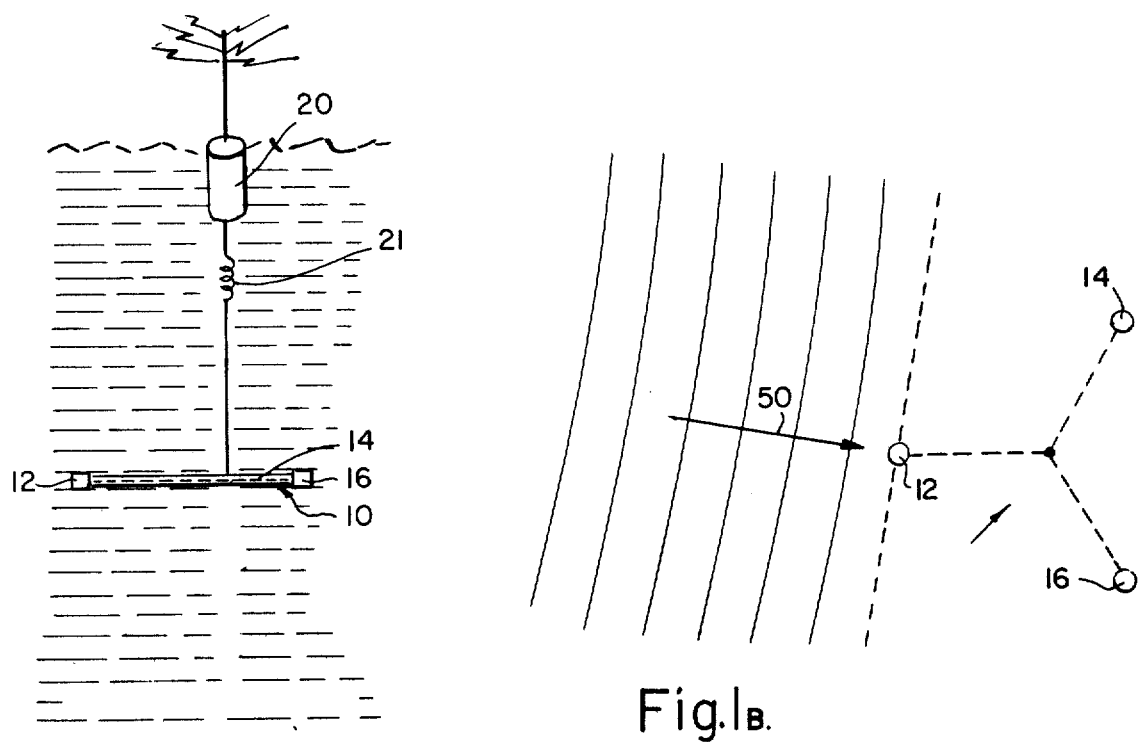
Fig.1A.
Fig.1B.
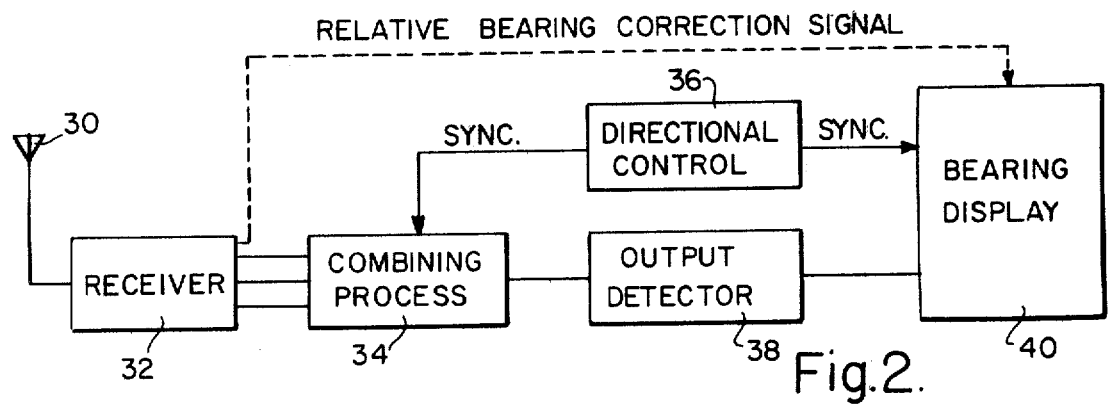
Fig.2.
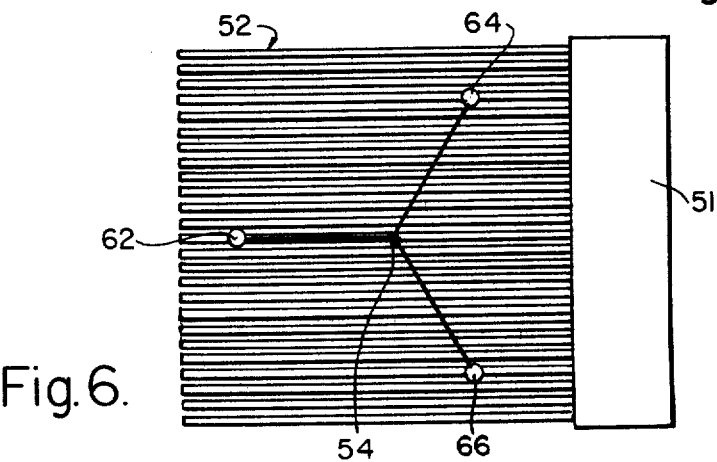
Fig.6.

ANTISUBMARINE WARFARE SYSTEM

BACKGROUND OF THE INVENTION

This invention relates to an antisubmarine warfare system, particularly to a sonobuoy system for detecting the presence of a discrete source of acoustic vibrations and for determining the direction of said source.

It is known that submarines produce acoustic vibrations which can be detected by means of submerged hydrophones over very long distances, e.g. tens of nautical miles due to the relatively high sound conductivity of water. Thus, detection and classification of submarines can be achieved by a series of sonobuoys spaced 20 to 30 nautical miles apart which transmit the information to an investigating ship or aircraft. Thereafter, the position of the submarine must be determined.

In a known submarine localization system omnidirectional sonobuoys are used which are air or ship-launched in pairs, and the information produced by each sonobuoy of any pair or so called "plant" is telemetered to the investigating ship or aircraft. This information is processed, and the time or phase difference between the time of arrival of the two data signals provides an ambiguous target bearing line. To resolve the ambiguity and refine the "fix" further "plants" are laid.

This method of submarine localization has a number of drawbacks which considerably reduce its efficiency particularly when dealing with faster and more manoeuverable modern submarines. For instance the time that an investigating aircraft requires to complete a sufficiently refined fix typically averages between 25 to 40 minutes and because of launching errors and uncertainties as to the exact trajectory of each sonobuoy, bearing errors can be as high as ±20 degrees.

Furthermore, this method is very costly as it often requires more than a dozen sonobuoys before a reasonably accurate fix can be defined.

The object of this invention is therefore to improve the localization capabilities of antisubmarine warfare equipment. More specifically an object of this invention is to provide a sonobuoy system capable of rapidly detecting the signals from and to a distant submarine using only the information received from a single buoy. To this effect the sonobuoy must carry at least three hydrophones to provide an unambiguous bearing, and the signal to ambient noise ratio of the acoustic information arriving at the hydrophone array must be sufficiently high to allow a usable bearing accuracy to be obtained.

A first proposal suggests the use of a station of three hydrophones tied to one another by means of flexible cables or ropes. However, due to the relative motion of the hydrophones the geometry of the array would not be sufficiently stable for rapid bearing determination and difficulties would be encountered in properly laying and maintaining the array.

A second proposal involves the use of a rigid structure for supporting the hydrophones. However, it is well known that underwater rigid structures generate considerable self noise, due to turbulence flow, resonance, etc., which would be immediately picked up by sensitive hydrophones and would render the data signals practically useless for beam steering processing.

SUMMARY OF THE INVENTION

In accordance with this invention we provide a sonobuoy for sensing acoustic vibrations emanating from a discrete source, and adapted to produce a signal suitable for remote reception and processing by beam forming and steering techniques, said sonobuoy comprising an array of at least three hydrophones maintained in a preselected geometric configuration one from the other, a semirigid generally neutrally buoyant underwater platform made of a water inflated soft walled element and mounting said hydrophones, and circuit means for transferring the signals produced by said hydrophones to a remote location.

We also provide a system for determining the direction of an underwater discrete source of acoustic vibrations by sensing acoustic wavefronts produced thereby, comprising a semirigid generally neutrally buoyant underwater platform made of a water inflated soft walled element, an acoustic wavefront sensing array of at least three omnidirectional hydrophones mounted on said structure in a preselected geometric arrangement, circuit means connected to said hydrophones, and array steering means associated with said circuit means and adapted to allow determination of the time relationship of the signals obtained from said hydrophones.

By this arrangement we have discovered that multi-sensor array technology well known in the field of radio could be successfully applied to the art of submarine detection and bearing determination since a platform is provided which is relatively silent when submerged, and which presents many practical advantages when used as an underwater expandable structure.

BRIEF DESCRIPTION OF DRAWINGS

The following is a description by way of example of certain embodiments of the present invention, reference being had to the accompanying drawings in which:

FIG. 1A is a diagrammatic elevation view of a sonobuoy including a submerged sensor array;

FIG. 1B is a plan view of a hydrophone array in a sound field;

FIG. 2 is a simplified block diagram of signal processing equipment;

FIG. 6 (on the sheet of FIG. 2) is a simplified plan view of an electro-mechanical analogue of an array in the sound field.

GENERAL DESCRIPTION OF SYSTEM

Figure 3:
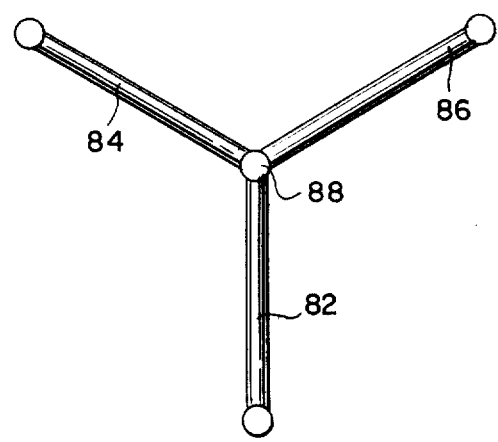
FIGS. 3, 4 and 5 are plan views of three different platforms.

The sonobuoy shown in FIG. 1A comprises a submerged horizontal platform referred to by numeral 10 on which a number of hydrophones are mounted, three being shown in FIG. 1B at 12, 14 and 16. The planar hydrophone array is suitably tethered to a surface float or buoy 20 which contains suitable telemetry equipment for transmitting the information picked up by the hydrophones to an investigating ship or aircraft. The telemetry system can be of any type; VHF-FM radio, and direct cable transmission are two examples.

The processing equipment of the investigating ship or plane can be as shown diagrammatically in FIG. 2, wherein an antenna 30 is coupled to a receiver 32 which provides three separate output signals corresponding to the information picked up by the individual hydrophones. The output of receiver 32 is fed to a combining processor 34 which is controlled by a synchronization signal produced by a relative direction control 36. The combined output of combining processor 34 is fed to an output detector 38 which causes a greater indication to appear at bearing display 40 whenever the array has been electrically "steered" in the direction of the wavefront being sensed by the hydrophones 12, 14, 16. To maintain the bearing display 40 in synchronism with the combining processor 34, directional control 36 also provides a synchronisation signal to bearing display 40.

In operation the background noise picked up by the three hydrophones 12, 14 and 16 is practically incoherent because in effect it emanates from all directions. However, a wavefront such as at 50 will be sensed by the three hydrophones in sequence and thus their output signals will be slightly out of phase. By suitable transmission these signals will maintain the same phase relationship to one another as they arrive at the combining processor 34.

SONOBUOY

Referring to the sonobuoy illustrated in FIG. 1A, the important features for unambiguous and acceptable hydrophone signals are that there must be at least three hydrophones usually omnidirectional, and a "silent" platform (i.e. one which produces practically no noise when submerged) for maintaining the hydrophones in a known, fixed geometric configuration. Preferably the hydrophones are evenly spaced on a circle to form, depending on the number of hydrophones, a triangle or a regular polygon, as the processing of the data signals is generally simpler when the array has at least one axis of symmetry, usually the vertical axis.

The sonobuoy system can be modified in various forms to suit the particular requirements of different applications as will be apparent to those skilled in the field of antisubmarine warfare. For instance, the radio equipment, when required, does not have to be mounted in the surface float as at least some components of it can be mounted on the array, and the surface float is not always required. It is only essential that the structure be quickly deployed and remain stable and operative for a sufficient length of time to enable detection of the submarine and determination of its bearing. Thereafter, the antenna could be allowed to sink to the bottom of the sea with the rest of the sonobuoy to prevent its falling into the hands of an enemy. A compass instrument can be mounted on the array platform for providing an indication of the orientation of the array, but it is conceivable that the compass instrument could also be dispensed with in some cases, with an explosive charge used instead for determining the orientation of the array as is well known in the art. The number of hydrophones can be increased to improve the signal to noise ratio and reduce the side lobe effect.

In accordance with this invention, the array platform is in the form of a water inflated soft walled element which is generally neutrally buoyant but which may sometimes be made slightly negatively buoyant to assist in maintaining constant depth. The water inflated soft walled element or platform 10 can be tethered to a surface float 20 as shown in FIG. 1A, and a suitable compliant link 21 can be used to reduce vibrations caused by the surface float and transmitted by the tether to the platform, and thus keeps the resonant frequency of any part of the system outside the acoustic frequency range in use. Various water inflated soft walled elements could be used and a few examples are shown in FIGS. 3, 4 and 5.

In FIG. 3 the element is made of three elongated tubular members 82, 84, 86 radiating from a central header 88 to define a "wye" or "star" shaped configuration. The hydrophones are mounted near the ends of the members, and an additional hydrophone could be mounted on the central header 88 to reduce the side lobe level of the beam pattern, and further hydrophones could be mounted intermediate the ends of the members 82, 84, 86 to provide a better signal-to-noise ratio. The number of radiating members with hydrophones can be increased to improve the symmetry of the array about its central vertical axis and thereby provide a more uniform beam pattern at the expense of a more complicated system.

Figure 4:
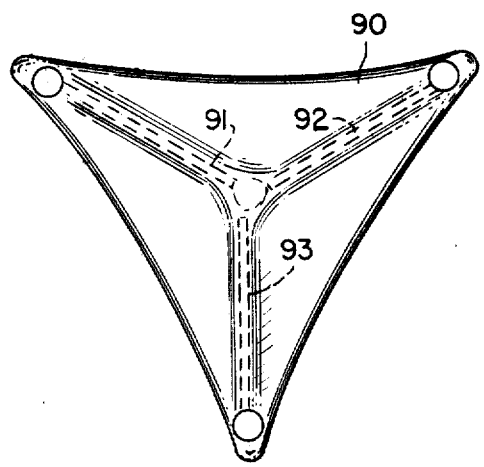

In FIG. 4 a mattress-like platform 90 is shown which consists of a single water inflated "bag" of flexible sheet material supporting three or more hydrophones. The shape of element 90 might be varied as desired to facilitate mounting of the hydrophones and simplify manufacture and packaging. For example, the outer contour of the element could be generally circular or in the form of a regular polygon of three or more equal sides. In order to prevent excessive bulging of the top and bottom sheets and thus keep a generally flat configuration in the inflated condition it may be necessary to provide internal webs such as shown at 91, 92, 93. These webs which may be in the form of strips of flexible material glued edgewise to the inner surfaces of the top and bottom sheets serve to maintain a fixed spacing between them and greatly improve the rigidity of the platform.

Figure 5:
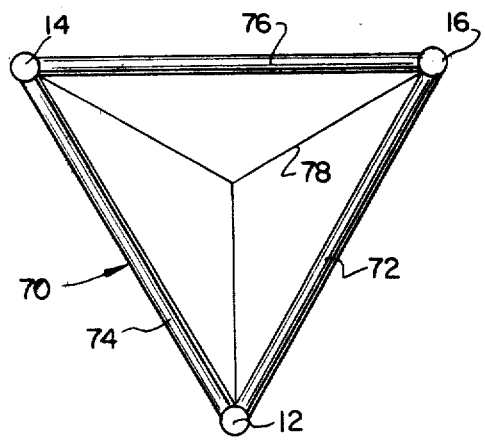

In FIG. 5 the element 70 is delta-shaped and consists of three similar, interconnected tubular members 72, 74, 76 supporting hydrophones 12, 14, 16 at their ends, and suspension means 78 such as wires or small cables for supporting the element to the surface float and connecting the hydrophones to the transmitting end of the telementry link.

The material for the water inflated element must be substantially water impermeable and sufficiently flexible to provide a semirigid structure when water inflated that can yield slightly to environmental perturbations such as underwater currents and the like so as to keep the level of the noise generated by the inflated structure sufficiently low. Various types of materials may be used for the water inflated element, for example, certain plastic materials that can be extruded or formed as a closed surface with a heat seal or glued seam such as polyethylene, or polyethylene-Mylar laminates, produced by Deerfield Laminates Ltd., Toronto. (Mylar is a trademark). The material used should retain its flexibility at the temperature of the water in which it is used.

In order to maintain the water inflated structure in its semirigid condition the internal pressure of the inflated element should be kept at a pressure somewhat greater than the ambient water pressure, such as about 2 psig.

The sonobuoy system is particularly advantageous for aircraft operations, where smallness of size is important in the air dropped package. In fact, the water inflatable platform can be rolled up into a compact arrangement and deployed only once in the water, inflation of the deployed package taking place in the water by virtue of a small water pump and valves associated with the package.

When towed behind a ship the water inflated structure may require certain modifications to improve the stability and rigidity of the array, such as stabilizing fins and the like.

The spacing of the hydrophones will be related to the number of hydrophones used and the maximum permissible width of the beam, and in practice it has been found for example that satisfactory results can be obtained in the frequency range of 100 Hz to 3000 Hz with delta, Y or star arrays with a 24 foot hydrophone spacing, i.e. in the delta array the tubular members are about 24 feet long whereas in the other cases the length of the tubular members is about 14 feet. The members can be constructed from plastic tubing of 0.003 inch wall thickness, 2 to 3 inches in diameter.

SIGNAL PROCESSING SYSTEM

Combining processor 34 operates in accordance with known beam forming techniques which by introducing different phase shifts in the three hydrophone signals creates a preferred direction of listening. In order to electrically "steer" the array i.e. rotate this beam or preferred direction of listening throughout 360 degrees, the directional control 36 systematically changes the phase shifting effected by combining processor 34. It will be appreciated that as the three signals approach an in-phase condition the combined output of processor 34 approaches its maximum.

Various types of combining processors, directional control and bearing display arrangements can be used for processing the array signals. For example, an analogue system is illustrated in FIG. 6 which causes the various data signals emanating from receiver 32 to be phase shifted and combined by means of a delay line before reaching output detector 38. A multi-tap delay line 51 with a large number of parallel conductor strips arranged as a platen type commutator 52 simulate the time propagation characteristics of a sound field, and three rigidly interconnected contacts 62, 64, 66, each representing a different one of the hydrophones 12, 14, 16 form an analogue of hydrophone array 10. By interconnecting the output channels of receiver 32 to the contacts 62, 64, 66 of model array 54, and by placing the contacts points 62, 64, 66 on conductor strips 52, each data signal passes through a section of delay line 51 and undergoes a corresponding phase shift. Therefore, for any position of the model array 54 a preferred direction of listening of the hydrophone array is defined, i.e. if a wavefront coming in this direction were sensed by the hydrophones the phase differences between the data signals would be compensated for the combination of phase shifts produced by the delay line 51, and in effect these three phase shifted signals would be effectively in-phase as they reach output detector 38.

In order to electrically "steer" the array 10, i.e. change the preferred direction of listening of the system, the model array 54 (or the commutator 52) can be rotated manually or by means of a suitable directional control system 36.

Another method of scanning could be the use of multiple delay lines to pre-form at 360° pattern of overlapping "beams", the electrical "steering" of the system being effected by sequential sampling of the various beam forming circuits.

There can be other techniques for beam forming and steering using digital rather than analogue processing. For instance, the received hydrophone signals could be fed to analogue-to-digital converters and then to a network of shift registers to provide the required delays. Such methods would obviously require more complex circuitry but would afford elimination of the mechanical switches or sliding contacts of the previously noted steering proposals.

In all these methods of scanning, the relative bearing information can be obtained by means of a pointer on a steering handwheel where steering is done manually, or by a suitable bearing display 40 which would be electrically or mechanically synchronised by the directional control 36. By way of example, directional control 36 could operate two synchronous motors, the first controlling the phase shifting effected by the combining processor 34, the other operation the indicator means of a remote bearing display 40.

Bearing display 40 which, as mentioned before can be a pointer on the model array 54 (FIG. 6), can also be of different types depending upon the type of combining processor 40 used, and whether the information should be permanently recorded or not. For example, a linear chart recorder could be provided for recording the amplitude of the combining processor as a function of the orientation of the "beam", or the same information could be represented as a radial display on a cathode ray tube as is used in radar with a sweeping beam rotating in synchronism with the electrical steering of the hydrophone array 10.

The orientation of hydrophone array 10 can be related to the angular position of model array 54 by means of suitable compass instrumentation (not shown), aboard the hydrophone array 10, producing a relative bearing correction signal which could be transmitted on a fourth channel of the telemetry system.

Alternatively, a charge could be used to determine the orientation of the hydrophone array 10 in accordance with well known techniques but this method has some disadvantages, both technical and tactical, for example, the orientation information is true only so long as the orientation of array 10 remains fixed after the detonation, and the noise produced by the charge will render any nearby submarine aware of the searching operation thus voiding the advantages of what otherwise would be a completely acoustically passive system.

What we claim as our invention is:

1. A system for determining the direction of an underwater discrete source of acoustic vibrations by sensing acoustic wavefronts produced thereby, comprising a semirigid generally neutrally buoyant underwater platform made of a water inflated soft walled element, an acoustic wavefront sensing array of at least three omnidirectional hydrophones mounted on said platform in a preselected geometric arrangement, and a telemetry link including transmitting means and receiving means, said transmitting means being connected to said hydrophones, and array steering means connected with said receiving means to allow determination of the time relationship of the signals obtained from said hydrophones.

2. A system as defined in claim 1, wherein said telemetry link comprises a multichannel VHF telecommunication system.

3. A system as defined in claim 1 including bearing display means for displaying the output of the array steering means so as to provide an indication of the bearing of said source relative to the geometry of said array.

4. A system as defined in claim 1, wherein the preselected geometric arrangement of said hydrophones is planar and horizontal.

5. A system as defined in claim 4, wherein said hydrophones are evenly spaced on a circle.

6. A system as defined in claim 1, wherein the preselected geometric arrangement of said hydrophones is symmetrical.

7. A system as defined in claim 5, wherein said hydrophones define the apexes of an equilateral triangle.

8. A system as defined in claim 7 including a fourth hydrophone disposed in the centre of said equilateral triangle.

9. A system as defined in claim 1, wherein said water inflated soft walled element is Y-shaped and comprises three elongated arms outwardly radiating from a center header, each arm carrying at its outer end one of said hydrophones.

10. A system as defined in claim 1, wherein said water inflated soft walled element is delta-shaped and comprises three elongated tubular members of equal length and interconnected in an end-to-end relationship, each hydrophone being mounted on a different one of the apexes of said delta-shaped element.

11. A system as defined in claim 1, wherein said water inflated soft walled element is a mattress-like member whose outer contour is generally circular.

12. A system as defined in claim 1, wherein said water inflated soft walled element is a mattress-like member whose outer contour is generally triangular.

13. A system as defined in claim 1, wherein said water inflated soft walled element is a mattress-like member whose outer contour is generally in the form of a regular polygon.

14. A system as defined in claim 1, wherein said array steering means comprises phase shifting means for simultaneously phase shifting the hydrophone signals to thereby electrically define a preferred direction of listening, and phase shifting control means to systematically vary the phase shifting of said hydrophone signals so as to thereby electrically steer said preferred direction of listening.

15. A system as defined in claim 14, wherein said phase shifting means is a multi-tap delay line and said phase shifting control means is a set of array signal contacts modelling said array and cooperating with a commutator platen coupled to the taps of said delay line to simultaneously phase shift said array signals and enable systematic variation of the phase shifting thereof by relative rotation of said set of contacts and said commutator platen.

* * * * *